US010572237B2

(12) United States Patent
Mahimkar et al.

(10) Patent No.: US 10,572,237 B2
(45) Date of Patent: Feb. 25, 2020

(54) MANAGING SOFTWARE CHANGES TO VIRTUAL NETWORK FUNCTIONS

(71) Applicants: AT&T Intellectual Property I, L.P., Atlanta, GA (US); AT&T Mobility II LLC, Atlanta, GA (US)

(72) Inventors: Ajay Mahimkar, Woodbridge, NJ (US); Zihui Ge, Madison, NJ (US); Jennifer Yates, Morristown, NJ (US); Deborah Cathey, Dallas, TX (US); Prasanna Ramachandran, Hazlet, NJ (US); Christopher May, Marlborough, MA (US); Vijay Gopalakrishnan, Edison, NJ (US)

(73) Assignees: AT&T Intellectual Property I, I.P., Atlanta, GA (US); AT&T Mobility II LLC, Atlanta, GA (US)

( * ) Notice: Subject to any disclaimer, the term of this patent is extended or adjusted under 35 U.S.C. 154(b) by 327 days.

(21) Appl. No.: 15/375,948

(22) Filed: Dec. 12, 2016

(65) Prior Publication Data
US 2018/0165084 A1   Jun. 14, 2018

(51) Int. Cl.
*G06F 8/65* (2018.01)
*G06F 9/455* (2018.01)

(52) U.S. Cl.
CPC ............ *G06F 8/65* (2013.01); *G06F 9/45558* (2013.01); *G06F 2009/45595* (2013.01)

(58) Field of Classification Search
CPC .................. G06F 8/65; G06F 9/45558; G06F 2009/45595

(Continued)

(56) References Cited

U.S. PATENT DOCUMENTS 5,504,921 A   4/1996 Dev et al.
6,701,358 B1   3/2004 Poisson et al.
(Continued)

FOREIGN PATENT DOCUMENTS

EP         3026849 A1    6/2016
WO   WO 2016/032467 A1   3/2016
(Continued)

OTHER PUBLICATIONS

Liang et al., "Virtual Backbone Generation and Maintenance in Ad Hoc Network Mobility Management", IEEE, 2000, 10pg. (Year: 2000).*

(Continued)

*Primary Examiner* — Ryan D. Coyer
(74) *Attorney, Agent, or Firm* — BakerHostetler

(57) ABSTRACT

A method includes measuring a first performance metric of a network comprising a plurality of virtual network functions (VNFs). The method also includes executing tasks to implement the software change on a first VNF set. The method also includes measuring a second performance metric of the network after at least one of the tasks has been completed and comparing the first performance metric to the second performance metric to determine a recommendation for whether to deploy the software change on the plurality of VNFs. The tasks are based upon a change management workflow created using a graphical model, the graphical model comprising modular building blocks selected from a change management catalog.

20 Claims, 12 Drawing Sheets

(58) Field of Classification Search
USPC .......................................................... 717/172
See application file for complete search history.

(56) References Cited

U.S. PATENT DOCUMENTS

| | | |
|---|---|---|
| 7,093,005 B2 | 8/2006 | Patterson |
| 7,363,623 B2 | 4/2008 | Kishida |
| 7,831,689 B2 | 11/2010 | Poisson et al. |
| 8,185,891 B2 | 5/2012 | Dehaan |
| 8,346,897 B2 | 1/2013 | Jaroker |
| 8,458,695 B2 | 6/2013 | Fitzgerald et al. |
| 8,572,587 B2 | 10/2013 | Dehaan et al. |
| 8,732,693 B2 | 5/2014 | Mutisya et al. |
| 8,943,489 B1 | 1/2015 | Qu |
| 9,038,055 B2 | 5/2015 | Mutisya et al. |
| 9,141,381 B2 | 9/2015 | Siddegowda |
| 9,164,749 B2 | 10/2015 | Dehaan |
| 9,172,606 B2 | 10/2015 | Rezvani et al. |
| 9,208,007 B2 * | 12/2015 | Harper ................ G06F 11/0709 |
| 9,218,195 B2 | 12/2015 | Anderson et al. |
| 9,794,160 B1 * | 10/2017 | Felstaine ................ H04L 43/04 |
| 10,064,167 B1 * | 8/2018 | Felstaine ........... H04W 72/0413 |
| 10,069,694 B1 * | 9/2018 | Schwartz ............ H04L 41/5096 |
| 10,116,514 B1 * | 10/2018 | Felstaine ................ H04L 41/12 |
| 2005/0229171 A1 | 10/2005 | Henry et al. |
| 2006/0080656 A1 * | 4/2006 | Cain ........................ G06F 8/65 717/174 |
| 2006/0184937 A1 | 8/2006 | Abels et al. |
| 2007/0266368 A1 * | 11/2007 | Szpak ....................... G06F 8/10 717/105 |
| 2014/0229928 A1 | 8/2014 | Edstrom et al. |
| 2014/0229945 A1 * | 8/2014 | Barkai .................... H04L 49/70 718/1 |
| 2014/0310707 A1 | 10/2014 | Rajan et al. |
| 2015/0082308 A1 | 3/2015 | Keiss et al. |
| 2015/0180730 A1 * | 6/2015 | Felstaine ............... H04L 41/022 709/225 |
| 2016/0043944 A1 * | 2/2016 | Felstaine ................. H04L 45/70 370/389 |
| 2016/0085641 A1 | 3/2016 | Nagasubramaniam et al. |
| 2016/0218948 A1 | 7/2016 | Djukic et al. |
| 2016/0234082 A1 | 8/2016 | Xia |
| 2016/0371063 A1 * | 12/2016 | Chiosi ....................... G06F 8/35 |

FOREIGN PATENT DOCUMENTS

| | | | |
|---|---|---|---|
| WO | WO 2016/078417 A1 | 5/2016 | |
| WO | WO 2016/128606 A1 | 8/2016 | |

OTHER PUBLICATIONS

"ECOMP (Enhanced Control, Orchestration, Management & Policy) Architecture White Paper"; Article; AT&T Inc.; © 2016; 31 pages.
Cloudband With Openstack As NFV Platform—Strategic White Paper /NFV Insight Series; Article; Alcatel-Lucent; © 2014; 11 pages.

* cited by examiner

MANAGING SOFTWARE CHANGES TO VIRTUAL NETWORK FUNCTIONS

TECHNICAL FIELD

This disclosure relates generally to managing virtualized network components and, more specifically, to managing software changes to virtual network functions (VNFs).

BACKGROUND

Communication networks have migrated from using specialized networking equipment executing on dedicated hardware, like routers, firewalls, and gateways, to virtualized network components, such as VNFs and virtual machines (VM) that may be implemented or run on general purpose hardware within a cloud infrastructure. Network management of network components—whether or not virtualized—may require implementing, from time to time, software changes across the network or across a subset of the network components. These software changes may include software patches, software updates, configuration changes, or installation/uninstallation of software.

Implementing software changes presents a number of difficulties. For example, the specific manner in which a software change is implemented on a network component may depend upon specific characteristics of that network component, such as its vendor or version. As another example, it may be desirable to avoid scheduling constraints, which may prevent certain software changes from being implemented at the same time. Further, it may be desirable to minimize or eliminate the impact of rolling out the software change on the network traffic. As another example, it may be advantageous to incrementally rollout a software change across the network to determine the impact that software change may have on network performance.

This disclosure is directed to solving one or more of the problems in the existing technology.

SUMMARY

In an aspect, this disclosure is directed to a software update system. The software update system may include a communication link for communicating with a network comprising a plurality of VNFs. The software update system may include a processor and memory storing instructions that cause the processor executing the instructions to effectuate operations. The operations may include determining a schedule to implement a software change on the plurality of VNFs based on a constraint. The operations may also include measuring a first performance metric of the network and executing tasks to implement the software change on a first VNF set. The operations may also include measuring a second performance metric of the network after at least one of the tasks has been completed and comparing the first performance metric to the second performance metric to determine a recommendation for whether to deploy the software change on the plurality of VNFs. The tasks may be determined based upon a change management workflow created using a graphical model. The graphical model may comprise modular building blocks selected from a change management catalog.

According to another aspect, this disclosure is directed to a method. The method may include receiving a change management workflow comprising modular building blocks. The method may include measuring a first performance metric of a network comprising a plurality of virtual network functions (VNFs) and executing the modular building blocks to implement the software change on a first VNF set. The method may include after at least one of the modular building blocks has been executed, measuring a second performance metric of the network to determine an impact of the software change on the first VNF set. The method may include determining a recommendation for whether to deploy the software change on the plurality of VNFs based on the impact. The change management workflow may be a product of a graphical modeling software environment including a modular building block catalog.

In an aspect, this disclosure is directed to a system. The system may include a catalog comprising building blocks. Each building block may include an abstraction for performing a common task for a plurality of virtual network function (VNF) types. The system may also include a change management workflow composer and a communication link for communicating with a network comprising virtualized components. The system may also include a processor and memory storing instructions that cause the processor to effectuate operations. The operations may include receiving, via the change management workflow composer, a software update workflow comprising a plurality of the building blocks. The operations may also include executing at least a subset of the plurality of the building blocks on a subset of the virtualized components and measuring an impact of executing the at least subset of the plurality of the building blocks on a network performance of the subset of the virtualized components. The operations may also include based on the impact, determining whether to implement the software update across a remainder of the virtualized components.

BRIEF DESCRIPTION OF THE DRAWINGS

Aspects of the herein described systems and methods for designing, scheduling, monitoring, and implementing software changes on a network are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1B:
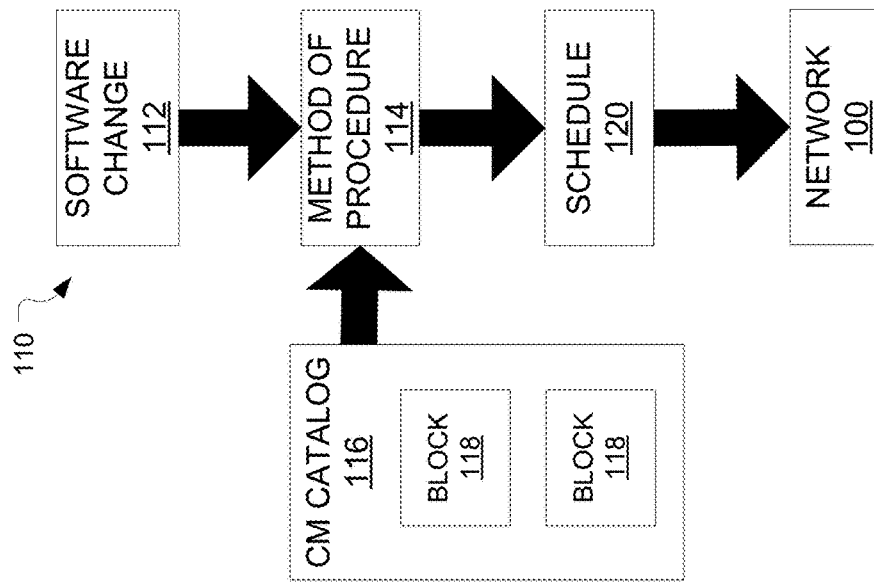
FIG. 1B depicts an exemplary data flow for implementing a software change on network 100.
Figure 1A:
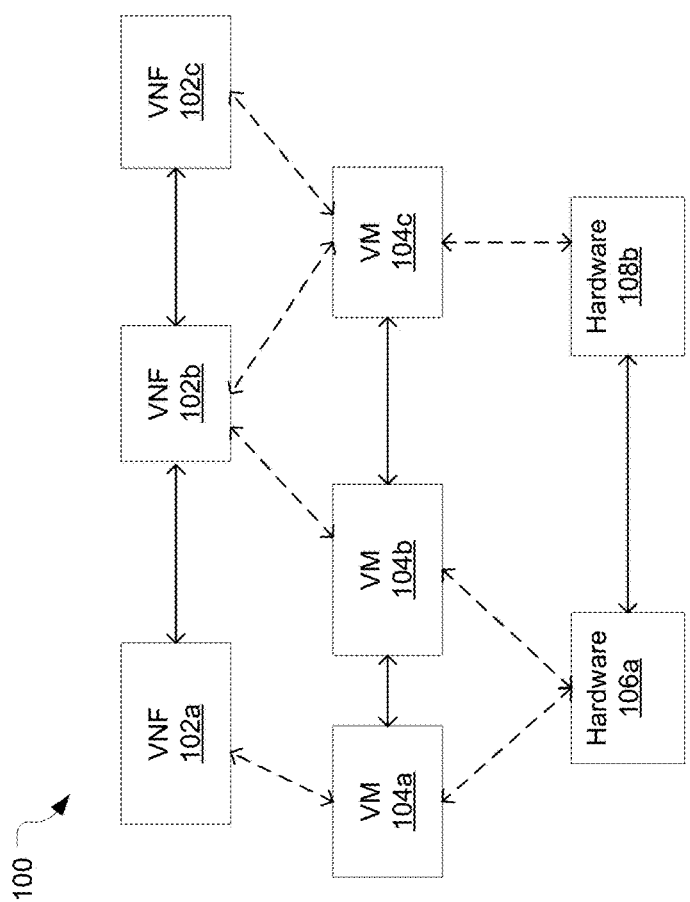
FIG. 1A is a representation of an exemplary network.

FIG. 1A is a representation of an exemplary communication network 100. Generally, communication networks 100 may be large, dynamic, or complicated. To update one or more parts of network 100, it may be advantageous to maintain records of the components or configurations of network 100. Network 100 may comprise a software defined network. Additionally or alternatively, one or more components of network 100 may comprise virtualized functions. For example, network 100 may include one or more virtualized functions implemented on general purpose hardware, such as in lieu of having dedicated hardware for every network function. That is, general purpose hardware of network 100 may be configured to run virtual network elements to support communication services, such as mobility services, including consumer services and enterprise services. These services may be provided or measured in sessions.

Network 100 may include network entities, including virtual network functions (VNFs) 102 implemented using one or more virtual machines (VMs) 104 running on or hosted by hardware 106. As shown in FIG. 1A, network 100 may include relationships between network entities (e.g., VNFs 102, VMs 104, and hardware 106). These relationships may include hosting, connectivity, or communication links.

Each VNF 102 may have a variety of characteristics. For example, a subset of VNFs 102 may be directed to virtualizing the same type of function. For example, VNFs 102 may include a packet data network gateway (PGW) VNF 102a, a policy and charging rules function (PCRF) VNF 102b, or a mobile management entity (MME) VNF 102c. Another VNF 102 characteristic may be the vendor. For example, network 100 may comprise multiple PGW VNFs 102a from different vendors. As another example, VNF 102 characteristics may include a version. For example, two PGW VNFs 102a having the same vendor may be different versions. Other characteristics of hardware 106 may include capacity, configurations, the type or amount of VMs 104 or hardware 106 supporting VNF 102, or other features.

Similarly, the characteristics of VMs 104 may differ. For example, VMs 104 may include a MCM VM 104a, an ASM VM 104b, or a DEP VM 104c. Another VM 104 characteristic may be the vendor. For example, network 100 may comprise multiple MCM VMs 104a from different vendors. As another example, VM 104 characteristics may include a version. For example, two MCM VMs 104a having the same vendor may be different versions. Other characteristics of VMs 104 may include capacity, configurations, the type, amount, or identity of VNFs 102 supported by VM 104, the type, amount, or identity of hardware 106 supporting VM 104.

Similarly, the characteristics of hardware 106 may differ. For example, hardware 106 may include computing hardware 106a and storage hardware 106b. Another hardware 106 characteristic may be the vendor. For example, network 100 may comprise multiple computing hardware 106a components from different vendors. As another example, hardware 106 characteristics may include a version. For example, two computing hardware 106a components sharing a common vendor may be different versions. Other characteristics of hardware 106 may include capacity, configurations, the type or amount of VMs 104 or VNFs 102 supported by hardware 106, or other features.

FIG. 1B illustrates an exemplary data flow 110 for implementing a software change 112 on network 100. For example, data flow 110 may be used implement software changes 112 on one or more elements of network 100. While the following discussion focuses on implementing software change 112 to VNF 102, the same technology may be used to implement software changes on other network components, such as VMs 104 or hardware 106.

Software change 112 may include software patches, software updates, configuration changes, or installation/uninstallation of software. The software change process may be captured in a change management (CM) method of procedure (MOP) 114. MOP 114 may comprise a sequence of instructions to be executed on VNF 102. For example, MOP 114 may include pre-checks of the health or status of VNF 102 or the service provided by VNF 102. MOP 114 may include backing up configuration of VNF prior to implementing software change 112 on VNF 102. MOP 114 may include post-checks of the health or status of VNF 102 or the service provided by VNF 102 following at least partial implementation of software change 112 on VNF 102 and, optionally, comparison of the metrics or data of the pre-check and the post-check. MOP 114 may also include fallout procedures to be implemented in the case of a failure.

Creation or design of MOP 114 may include low-level instructions that may be specific to one or more VNFs 102 to be upgraded. For example, the low-level instructions may vary depending upon the vendor or type of VNF 102. This may require knowledge or entry of the exact command for making the new software image as the boot image. This may make implementation time-consuming or difficult or prone to errors.

One solution may be to use a CM catalog 116. In an aspect, CM catalog 116 may comprise one or more building blocks 118 that collectively capture tasks that make up MOP 114. Designing building blocks 118 may comprise identifying overlapping or common functionality used to implement software changes 112. Building block 118 may comprise a layer of abstraction that may enable a user designing MOP 114 to operate at a higher level of functionality, without the need to focus on details regarding specific commands based on characteristics of VNFs 102. Building blocks 118 may be designed to implement health checks, software download, software installation, performance analytics, or fall-out procedures. Building blocks 118 of CM catalog 116 may be modular, such that they may be used for multiple upgrade activities. For example, a type of health check building block 118 may measure how many sessions VNF 102 is supporting, regardless of the type, vendor, version, or other characteristic of VNF 102.

MOP 114 may be created by modular composition, such as stitching together different building blocks 118. In an aspect, MOP 114 composition may be performed using a graphical model. For example, modular composition may be performed using business process model and notation (BPMN). In an aspect, this may decrease the amount of programming a user may do to create MOP 114. Further, this enables users who do not have the requisite programming expertise to create MOP 114.

The separation of workflow design (e.g., modular composition of MOP 114 using CM catalog 116) and building block 118 implementation (e.g., stored in CM catalog 116) may enable systematic and automatic balancing of workflow in instances where there are updates to building blocks 118. For example, implementing a change to a building block 118 may be done in lieu of manually updating each MOP 114 that includes the functionality implemented by that building block 118.

Dataflow 110 may also include determining a schedule 120 for implementing software change 112 on network 100. In an aspect, schedule 120 may comply with one or more constraints. For example, a constraint may comprise a vertical constraint or a horizontal constraint.

A vertical constraint may prevent updating or changing a first network element, such as VNF 102*a* at the same type as an update or change is being made to a second network element that has some hosting relationship with the first network element. For example, a vertical constraint may prevent simultaneously changing VM 104*b* and VNF 102*b*, as PCRF VNF 102*b* is at least partially implemented or hosted on VM 104*c*. In contrast, no vertical constraint may prevent simultaneously changing VM 104*a* and MME VNF 102*c*, as VM 104*a* and MME VNF 102*c* do not share a vertical relationship.

A horizontal constraint may prevent simultaneously updating or changing VNFs 102 share a common role. For example, a horizontal constraint may prevent simultaneously updating a customer's primary PGW VNF 102*a* and its backup PGW VNF 102*a*. In contrast, simultaneously updating a customer's PGW VNF 102*a* and PRCRF VNF 102*b* may not present a horizontal constraint, depending upon the particulars of the upgrade and that customer's network usage.

Constraints may include other limits on schedule 120. For example, one or more constraints may be used to avoid scheduling software changes during peak network usage time periods. As another example, a constraint may estimate the time the software change will take to complete. Constraints may also include available network resources that may be used to effect the software change. For example, as discussed in more detail below, implementing software change 112 may include offloading network traffic from a first VNF 102 to a replacement VNF 102 prior to implementing software change 112 on the first VNF 102. Other constraints may define prerequisites to implementing software change 112. For example, a first software change 112 implementing a software patch to a version 2.3 software may be done following a check to ensure that VNF 102 to be updated is running version 2.3 software. Additionally or alternatively, the constraint may include upgrading VNF 102 to version 2.3 before implementing the software patch. These and other constraints may factor into determining schedule 120 for software change 112.

Figure 1C:
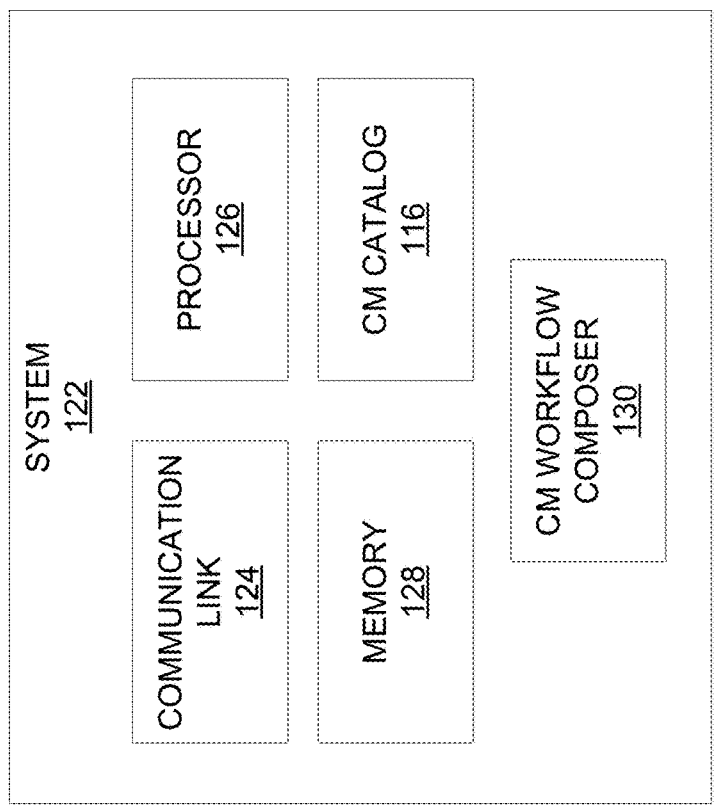
FIG. 1C is a representation of an exemplary software update system.

FIG. 1C is a schematic of an exemplary system 122, such as a software update system, that may be used to implement one or more software changes 112 on all or a portion of network 100. In an aspect, system 122 may comprise a communication link 124 that may facilitate communications between system 122 and network 100. For example, communication link 124 may facilitate data or commands to be communicated between system 122 and network 100.

System 122 may include a processor 126 and memory 128. Memory 128 may store instructions that, when executed by processor 126, cause the processor to effectuate operations to implement software change 112. System 122 may include or have access to CM catalog 116. In an aspect, CM catalog 116 may facilitate implementing software change 112. At least a portion of building blocks 118 in CM catalog 116 may comprise an abstraction for performing a common task for a plurality of VNF 102 types. System 122 may comprise a CM workflow composer 130. CM workflow composer 130 may comprise an interface through which a user can access at least a portion of CM catalog 116. Through CM workflow composer 130, a user may design a CM workflow, such as by selecting one or more building blocks 118, to implement software change 112.

Figure 2A:
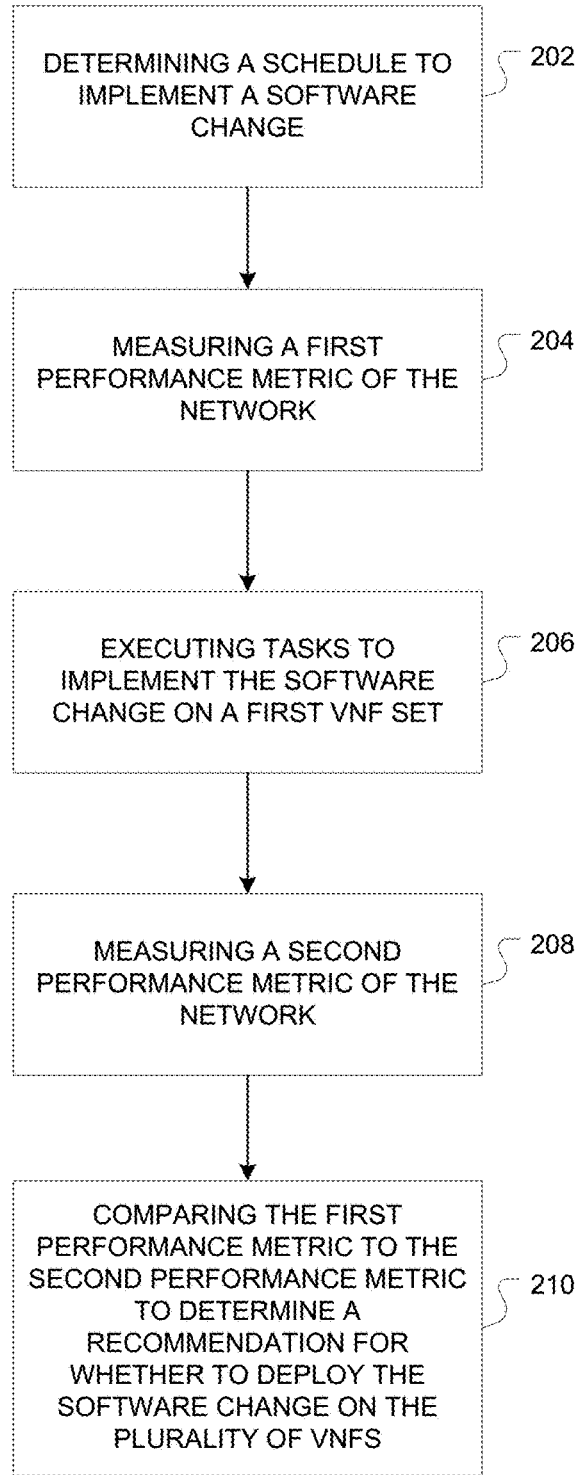
FIG. 2A is an exemplary method for mapping node/edge data structures to higher level abstractions.

FIG. 2A is a flowchart of an exemplary method 200 that may be used to implement software change 112. In an aspect, all or part of method 200 may be performed or facilitated by system 122.

At step 202, method 200 may include determining schedule 120 to implement software change 112 on a plurality of virtualized components of network 100. In an aspect, the virtualized components may comprise one or more VNFs 102 or VMs 104. Schedule 120 may be based on at least a constraint. For example, the constraint may be a vertical constraint. A vertical constraint may prohibit or disallow simultaneous or overlapping performance of changes to two components of network 100 that share a vertical relationship. As another example, the constraint may be a horizontal constraint. A horizontal constraint may prohibit or disallow simultaneous or overlapping performance of changes to two similarly situated components of network 100. As another example, the constraint may include other limitations, restrictions, or expected or desired requirements for software change 112 or network 100.

At step 204, method 200 may include measuring a first performance metric of network 100. First performance metric may be a measurement of an aspect of all or a portion of network 100. For example, the first performance metric may measure an average packet transfer rate across network 100. As another example, the first performance metric may measure an average packet transfer rate for a given subscriber, who may or may not be using all of network 100. Optionally, the first performance metric may be measured before any tasks have been performed on network 100 to implement software change 112.

At step 206, method 200 may include executing tasks to implement the software change on a first VNF 102 set. In an aspect, the first VNF 102 set may be a subset of the plurality of VNFs 102. Additionally or alternatively, first VNF 102 set may comprise different VNFs 102 than the plurality of VNFs 102. For example, prior to executing the tasks, method 200 may include instantiating other VNFs 102. These VNFs 102 may comprise the first VNF 102 subset. These VNFs 102 may be replacement VNFs 102, designed to mirror the configuration and function of at least a portion of the plurality of VNFs 102 upon which software change 112 is to be implemented.

Executing tasks to implement software change 112 may be based on building blocks 118 or MOP 114, which may comprise one or more building blocks 118. As discussed above, building blocks 118 may be modular. Building blocks 118 may comprise abstractions of functionality to enable execution of one or more tasks on different types of VNFs 102 or VMs 104. The tasks may be determined based upon a CM workflow (e.g., MOP 114) created using a graphical model, such as via CM workflow composer 130. As discussed above, a CM workflow may comprise building blocks 118 selected from CM catalog 116.

At step 208, method 200 may include measuring a second performance metric of network 100 after at least one of the tasks has been completed. The second performance metric may measure the same feature or aspect of network 100 that first performance metric did. Additionally or alternatively, the second performance metric may measure a different feature or aspect of network 100 than first performance metric did. Step 208 may optionally be part of a continuous watchdog functionality that conducts performance comparisons. This may be done to ensure no unexpected behaviors or degradations that result from executing the tasks. Further, the measured performance metrics may be logged, optionally along with a log of the tasks executed, for correlation or future troubleshooting.

At step 210, method 200 may include comparing the first performance metric to the second performance metric. The combination of steps 204, 208, and 210 may be used to infer the performance impacts (if any) of software change 112 on network 100. In instances where first VNF subset 102 comprises an early phase of a phased deployment of software change 112, such as a first field application, the performance metrics and comparison thereof may be used to decide whether to rollout software change 112 across a remainder of the plurality of VNFs 102. As a result of this comparison, at step 210, a recommendation whether to deploy software change 112 on the plurality of VNFs 102 (e.g., to rollout the next or all stages of deployment of software change 112).

In an aspect, the result of method 200 may be a recommendation to deploy software change 112 on the plurality of VNFs 102. This may include, for example, instantiating a plurality of replacement VNFs 102. The plurality of replacement VNFs 102 may be at least partially based on the plurality of VNFs 102. Further, the plurality of replacement VNFs 102 may be based on software change 112. That is, the plurality of replacement VNFs 102 may resemble the plurality of VNFs 102 had software change 112 been implemented across all of them. In this manner, instead of disrupting operation of the plurality of VNFs 102, which may be in use by one or more network subscribers, the replacement VNFs 102 may be created, and network traffic from the plurality of VNFs 102 then transferred to the plurality of replacement VNFs 102. This may decrease any network downtime or traffic disruption that may result as part of implementing software change 112.

Figure 2B:
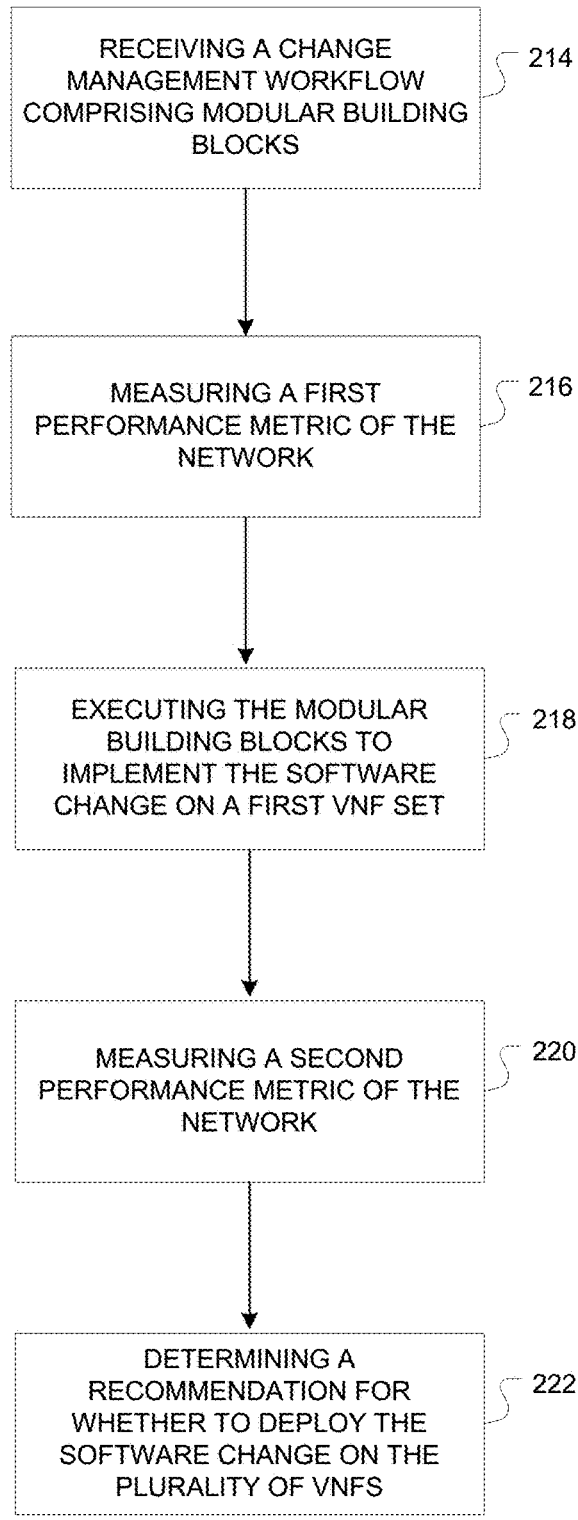
FIG. 2B is an exemplary method for executing an abstraction query on a graph database.

FIG. 2B is a flowchart of an exemplary method 212 that may be used to implement software change 112. In an aspect, all or part of method 200 may be performed or facilitated by system 122.

At step 214, method 212 may include receiving a CM workflow (e.g., MOP 114) comprising modular building blocks 118. In an aspect, CM workflow may be created using CM workflow composer 130 by selecting building blocks 118 from CM catalog 116. Building blocks 118 may include a health check building block 118, which may measure one or more metrics or monitor one or more statuses related to network 100. Building blocks 118 may include a software download building block or a software installation building block 118, which may be used to download or install software, software updates, software patches, or other files. Building blocks 118 may include a performance analytics building block 118, which may analyze or respond to data collected by a health check building block. Building blocks 118 may include a fall-out procedure building block 118 to perform functions or steps in response to an undesirable or negative impact of implementing one or more other building blocks, such as undoing one or more of the tasks.

Method 212 may optionally include determining schedule 120 to implement software change 112. Schedule 120 may be based on one or more constraints. For example, the constraint may include a vertical constraint or a horizontal constraint.

At step 216, method 212 may include measuring a first performance metric of network 100. First performance metric may be a measurement of an aspect of all or a portion of network 100. For example, the first performance metric may measure an average packet transfer rate across network 100. As another example, the first performance metric may measure an average packet transfer rate for a given subscriber, who may or may not be using all of network 100. Optionally, the first performance metric may be measured before any tasks have been performed on network 100 to implement software change 112.

At step 218, method 212 may include executing modular building blocks 118 to implement software change 112 on a first VNF 102 set. The first VNF 102 set may comprise a subset of the plurality of VNFs 102 upon which software change 112 is intended to be implemented. Additionally or alternatively, method 212 may include instantiating a plurality of replacement VNFs 102 based on at least one of the plurality of VNFs 102, and first VNF set 102 may comprise one or more of the plurality of replacement VNFs 102. For example, once modular building blocks 118 are executed on the replacement VNFs 102, method 212 may include transferring network traffic from the plurality of VNFs 102 to the plurality of replacement VNFs 102. After the network traffic is transferred to the plurality of replacement VNFs 102, method 212 may include deallocating the original plurality of VNFs 102 that were replaced by the plurality of replacement VNFs 102.

As discussed above, building block 118 may comprise an abstraction with the functionality or flexibility to implement the same or similar functionality across a plurality of virtualized components. For example, building block 118 may be able to implement the same software change 112 across VNFs 102 having different vendors, versions, or types.

For example, executing building block 118 on a plurality of VNFs 102 may result in different instruction sets being executing on different VNFs 102, depending on the VNF 102 type. For example, building block 118 may comprise or call a first instruction set to implement the software change on a first type of VNF 102, while the same building block 118 may comprise or call a second instruction set to implement the software change on a second type of VNF 102.

At step 220, method 212 may include measuring an impact of executing the at least subset of the plurality of the building blocks on a network performance of the subset of VNFs 102. For example, this may include comparing metrics measured before performance of any of step 218 with metrics measured after performance of any of step 218.

At step 222, method 212 may include, based on the impact, determining whether to implement software change 112 across a remainder of VNFs 102. If the determining is to continue with implementing software change 112 across the reminder of VNFs 102 this may include instantiating a plurality of replacement VNFS 102 based on the remainder of VNFs 102, executing modular building blocks 118 on the plurality of replacement VNFs 102, and transferring network traffic from the plurality of VNFs 102 to the plurality of replacement VNFs 102.

Further, executing modular building blocks 118 across one or more of the plurality of VNFs may be able to be paused, such as in accordance with schedule 120 or based on a network change or user input. The ability to pause and resume executing modular building blocks 118 may be used to flexibly and reactively implement software change 112 throughout network 100.

Figure 3:
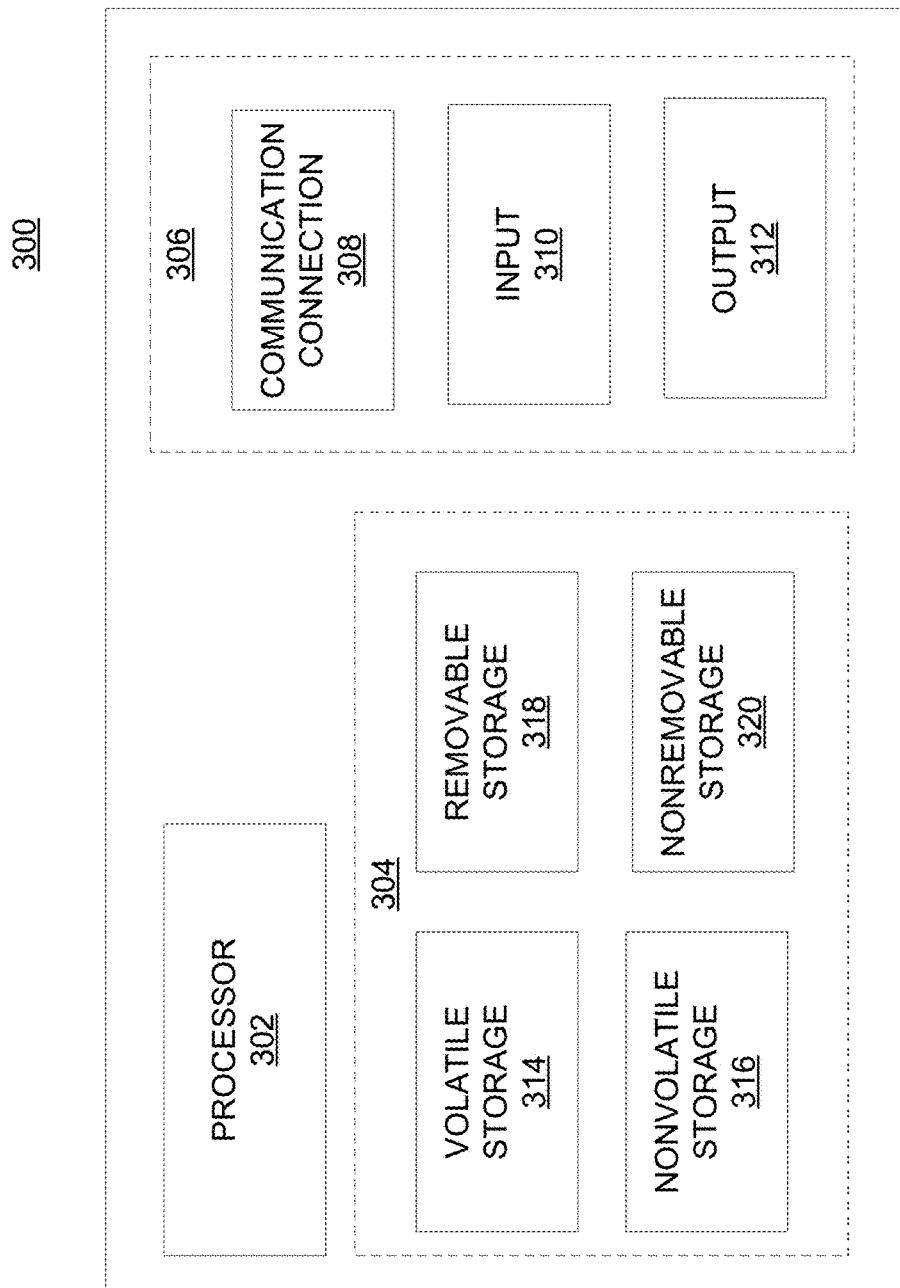
FIG. 3 is a schematic of an exemplary device that may be used to implement the disclosed systems or methods.

FIG. 3 is a block diagram of network device 300 that may be connected to or comprise a component of network 100 or system 122. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
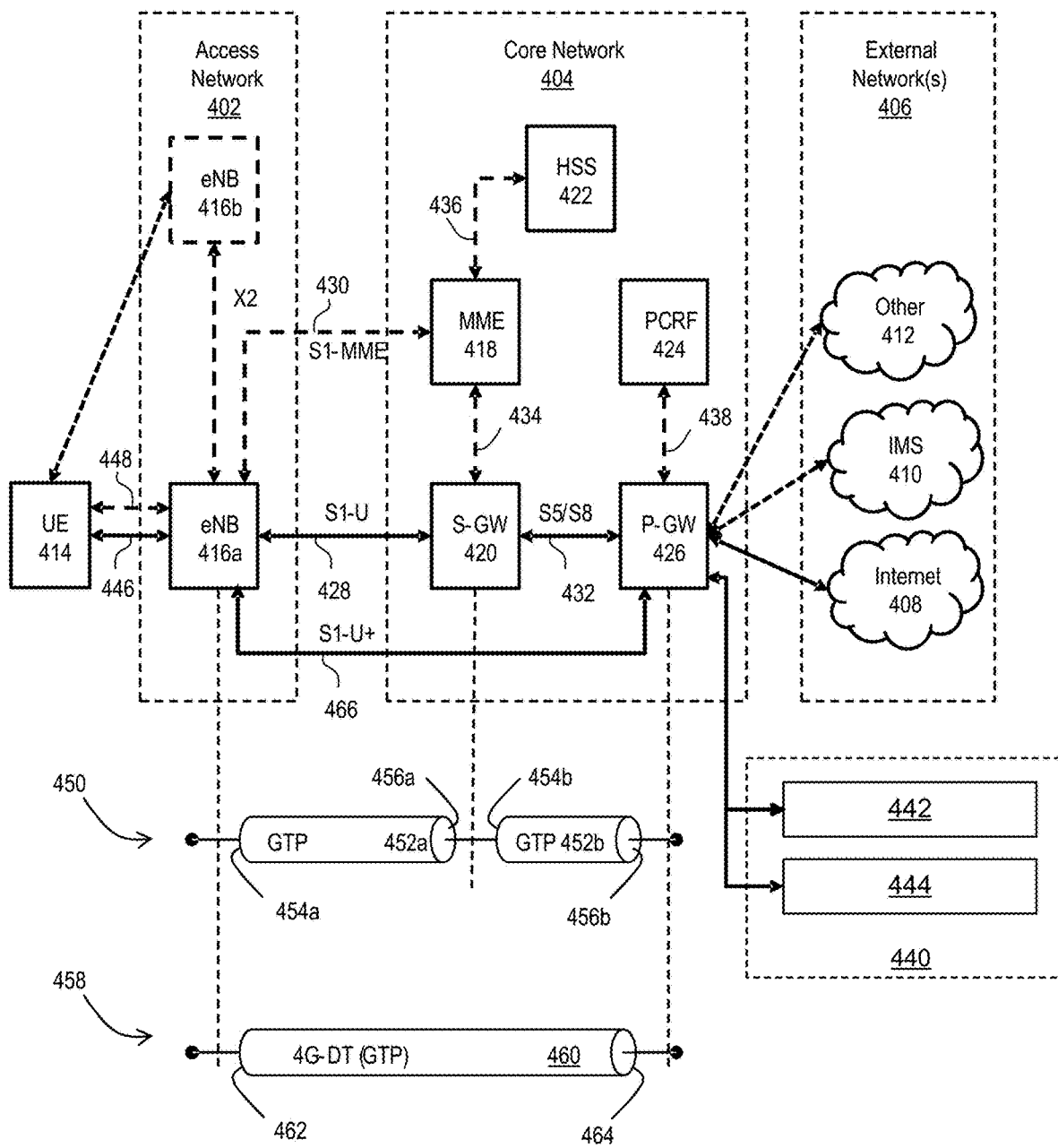
FIG. 4 depicts an exemplary communication system that provide wireless telecommunication services over wireless communication networks that may be modeled using the disclosed systems and methods for mapping service and resource abstractions to a network-inventory graph database.

FIG. 4 illustrates a functional block diagram depicting one example of an LTE-EPS network architecture 400 related to the current disclosure. For example, network architecture 400 may include network 100. The network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 405 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416*a* and PGW 426. Notably, S1-U+ path/interface does not include SGW 420, a node that is otherwise instrumental in configuring and/or managing packet forwarding between eNB 416*a* and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416*a*, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
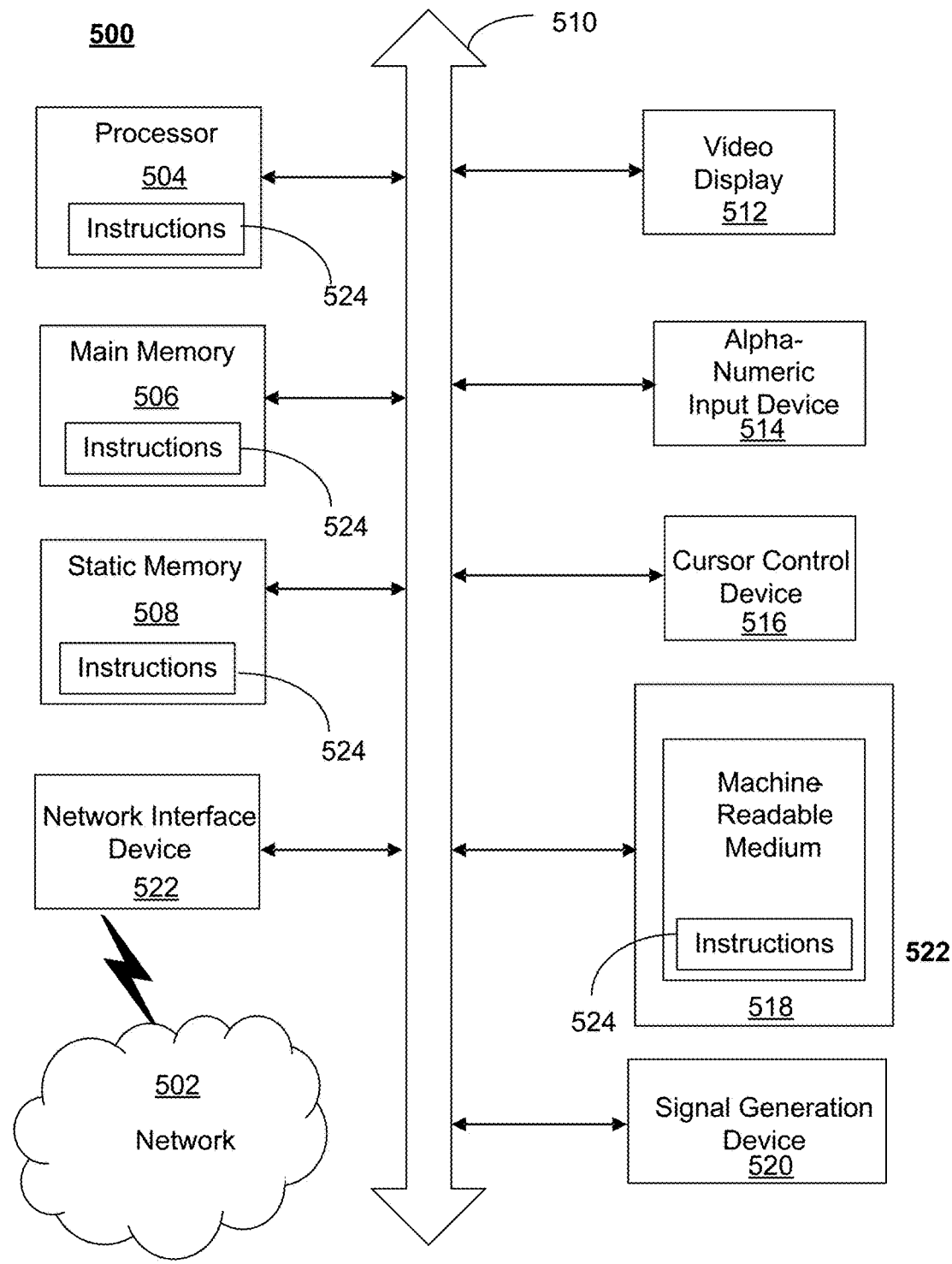
FIG. 5 depicts an exemplary communication system that provide wireless telecommunication services over wireless communication networks that may be modeled using the disclosed systems and methods for mapping service and resource abstractions to a network-inventory graph database.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
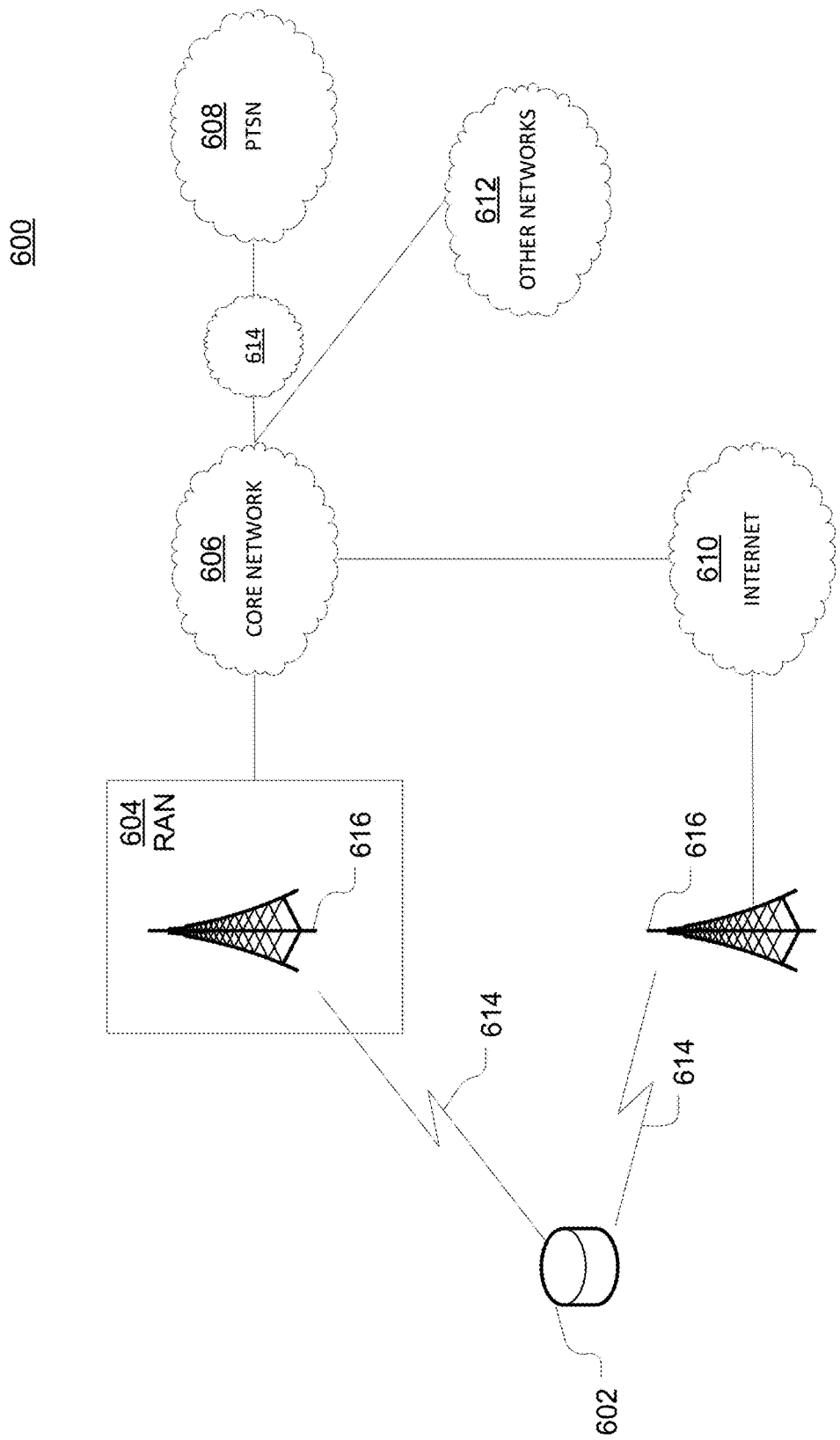
FIG. 6 is a diagram of an exemplary telecommunications system that may be modeled using the disclosed systems and methods for mapping service and resource abstractions to a network-inventory graph database.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
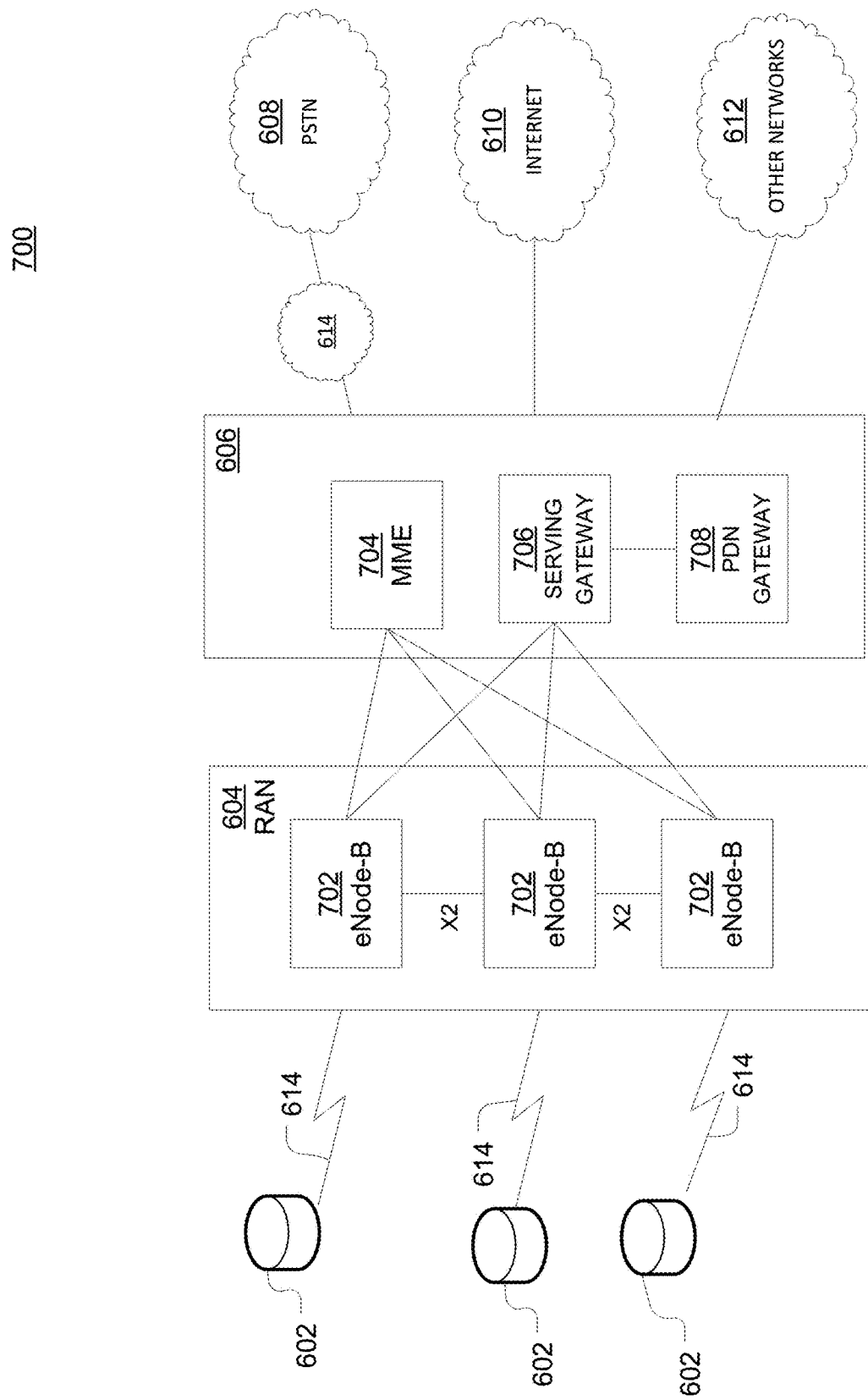
FIG. 7 is an exemplary system diagram of a radio access network and a core network that may be modeled using the disclosed systems and methods for creating a graph database.

FIG. 7 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
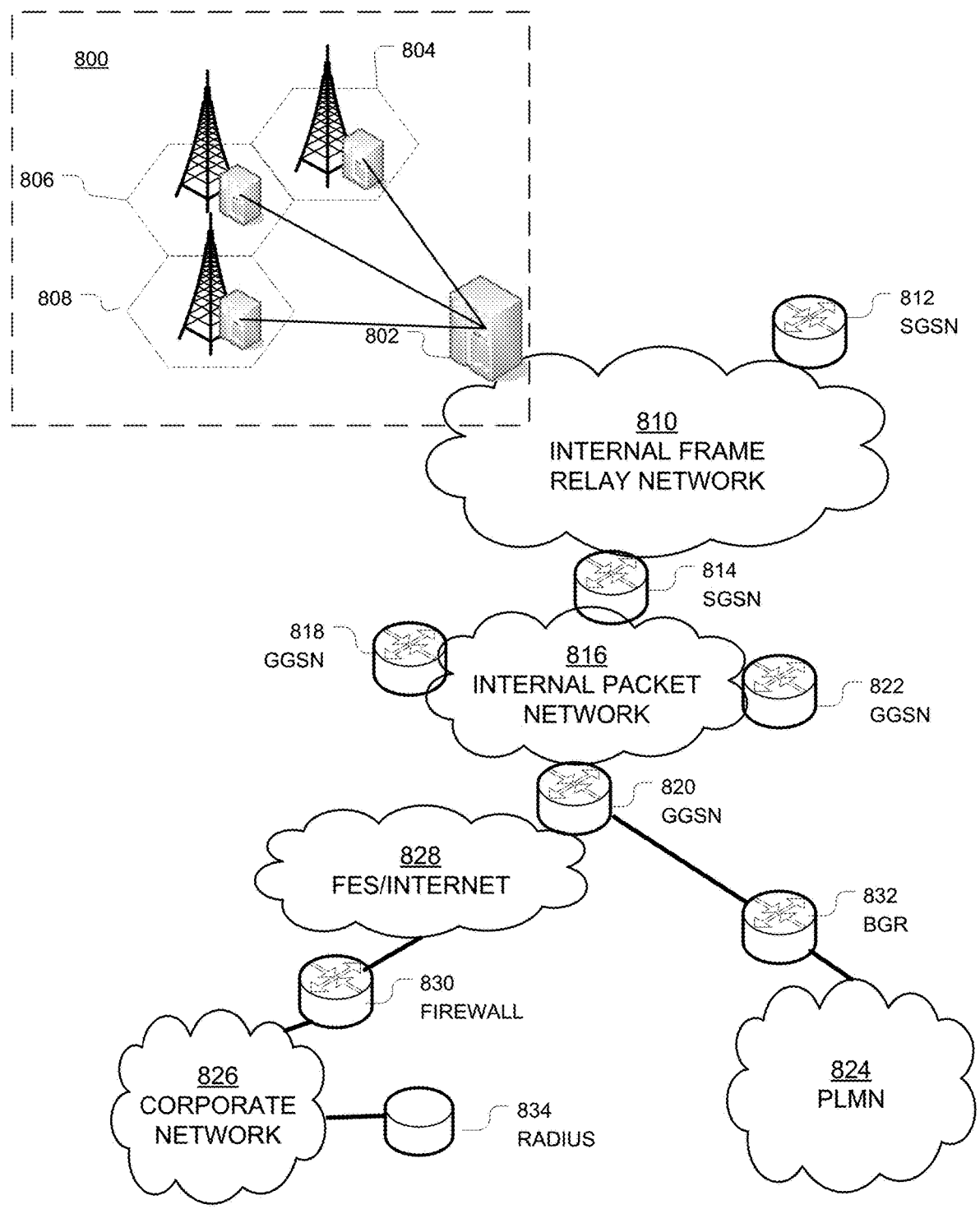
FIG. 8 depicts an overall block diagram of an exemplary packet-based mobile cellular network environment, such as a general packet radio service (GPRS) network that may be modeled using the disclosed systems and methods for mapping service and resource abstractions to a network-inventory graph database.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
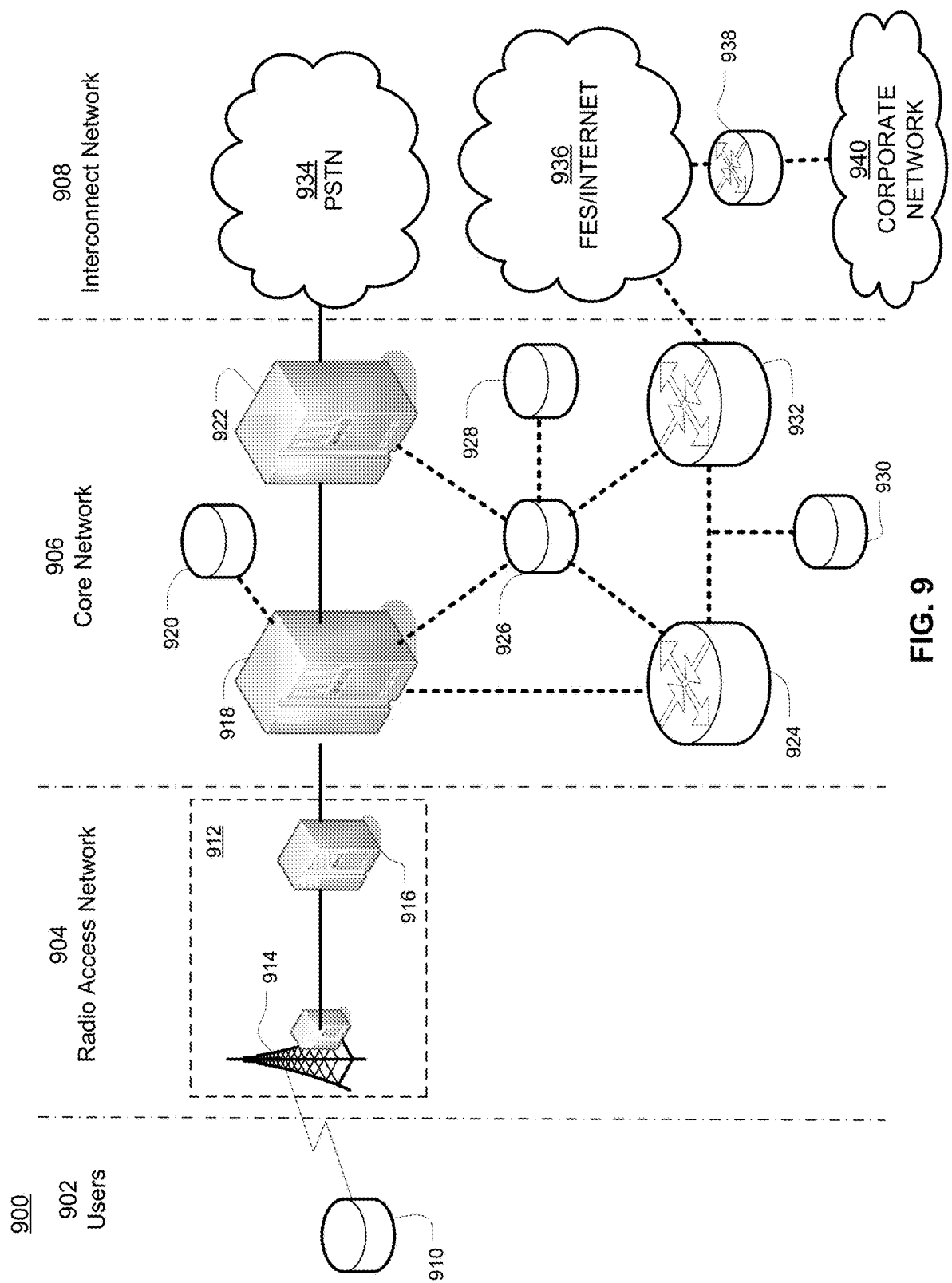
FIG. 9 illustrates an exemplary architecture of a GPRS network that may be modeled using the disclosed systems and methods for mapping service and resource abstractions to a network-inventory graph database.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
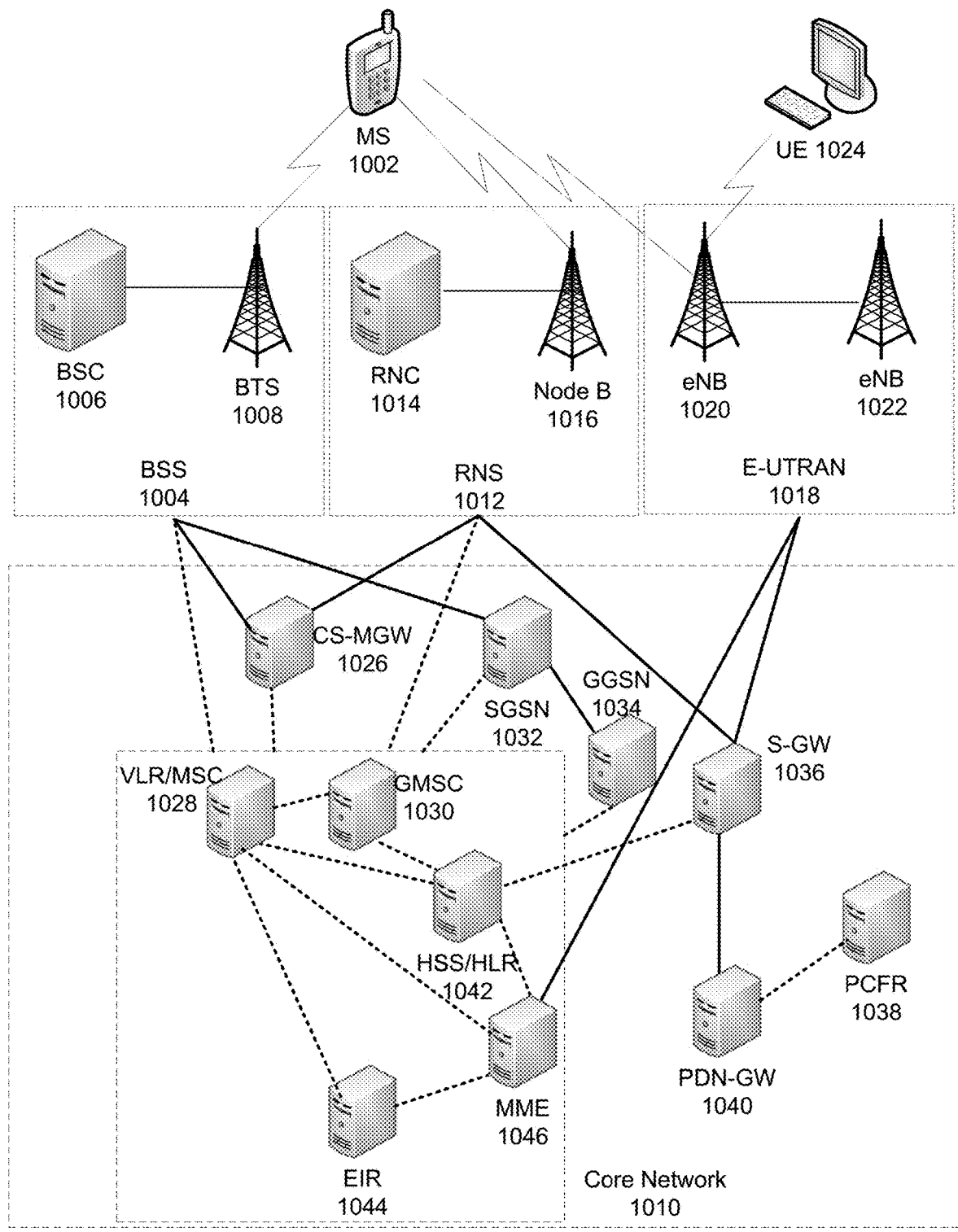
FIG. 10 is a block diagram of an exemplary public land mobile network (PLMN) that may be modeled using the disclosed systems and methods for mapping service and resource abstractions to a network-inventory graph database.

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed is:

1. A software update system comprising:
a communication link for communicating with a network comprising a plurality of virtual network functions (VNFs);
a processor;
memory storing instructions that cause the processor executing the instructions to effectuate operations, the operations comprising:
providing a change management catalog to a user, the change management catalog comprising modular building blocks;
receiving, through a change management workflow composer, a graphical model created by a user input indicative of a selection of the modular building blocks and an order of the modular building blocks, the graphical model indicative of tasks to implement a software change;
determining a schedule to implement the software change on the plurality of VNFs based on a constraint;
measuring a first performance metric of the network;
executing the modular building blocks in the order to implement the software change on a first VNF set based on the schedule;
measuring a second performance metric of the network after at least one of the modular building blocks has been executed; and
comparing the first performance metric to the second performance metric to determine a recommendation for whether to deploy the software change on the plurality of VNFs.

2. The software update system of claim 1, wherein the constraint comprises a horizontal constraint.

3. The software update system of claim 2, wherein the horizontal constraint comprises a restriction against an overlap between an implementation of a change to a primary VNF update for a customer and an implementation of the change to a backup VNF for the customer.

4. The software update system of claim 1, wherein the constraint comprises a vertical constraint.

5. The software update system of claim 4, wherein the vertical constraint comprises a restriction against an overlap between an implementation of a first change to a first VNF and an implementation of a second change to a network element that hosts the first VNF.

6. The software update system of claim 1, wherein at least one of the modular building blocks comprises functionality to enable execution of at least one of the tasks on a plurality of VNF types.

7. The software update system of claim 1, wherein the recommendation comprises recommending to deploy the software change on the plurality of VNFs and the operations further comprising:
instantiating a plurality of replacement VNFs in the network based on the plurality of VNFs and the software change; and
transferring network traffic from at least a portion of the plurality of VNFs to the plurality of replacement VNFs.

8. A method comprising:
providing a change management catalog to a user, the change management catalog comprising modular building blocks;
receiving, through a change management workflow composer, a graphical model created by a user input indicative of a selection of the modular building blocks and an order of the modular building blocks, the graphical model indicative of tasks to implement a software change;
measuring a first performance metric of a network comprising a plurality of virtual network functions (VNFs);
executing the modular building blocks of the graphical model to implement the software change on a first VNF set;
after at least one of the modular building blocks has been executed, measuring a second performance metric of the network to determine an impact of the software change on the first VNF set; and
determining a recommendation for whether to deploy the software change on the plurality of VNFs based on the impact.

9. The method of claim 8, wherein executing at least one of the modular building blocks comprises:
executing a first instruction set to implement the software change on a first type of VNF of the first VNF set; and
executing a second instruction set to implement the software change on a second type of VNF of the first VNF set.

10. The method of claim 8, wherein the first VNF set comprises a subset of the plurality of VNFs.

11. The method of claim 8, further comprising:
instantiating a plurality of replacement VNFs based on at least one of the plurality of VNFs,
wherein the first VNF set comprises a subset of the plurality of replacement VNFs.

12. The method of claim 11, further comprising:
executing the modular building blocks to implement the software change on the plurality of replacement VNFs; and
transferring network traffic from the plurality of VNFs to the plurality of replacement VNFs.

13. The method of claim 12, further comprising:
deallocating resources from the plurality of VNFs.

14. The method of claim 8, further comprising:
executing the modular building blocks to implement the software change on the plurality of VNFs;
pausing the executing; and
resuming the executing.

15. The method of claim 8, further comprising:
determining a schedule to implement the software change on the plurality of VNFs based on at least one of a vertical constraint or a horizontal constraint.

16. A system comprising:
a catalog comprising building blocks, wherein each building block comprises an abstraction for performing a common task for a plurality of virtual network function (VNF) types;
a change management workflow composer;
a communication link for communicating with a network comprising virtualized components;
a processor; and
memory storing instructions that cause the processor to effectuate operations, the operations comprising:
   receiving, via the change management workflow composer, a graphical model comprising a plurality of the building blocks indicative of a software update workflow;
   executing a subset of the plurality of the building blocks on a subset of the virtualized components;
   measuring an impact of executing the subset of the plurality of the building blocks on a network performance of the subset of the virtualized components; and
   based on the impact, determining whether to implement the software update across a remainder of the virtualized components.

17. The system of claim 16, wherein the building blocks comprise at least one of a health check building block, a software download building block, a software installation building block, a performance analytics building block, or a fall-out procedure building block.

18. The system of claim 16, wherein executing at least one of the building blocks on the subset of the virtualized components comprises:
   determining a type of each of the subset of the virtualized components;
   executing a first series of steps to implement the common task on a first type of the subset of the virtualized components; and
   executing a second series of steps to implement the common task on a second type of the subset of the virtualized components.

19. The system of claim 16, further comprising:
based on determining to implement the software update across the remainder of the virtualized components, instantiating replacement virtualized components based on the remainder of the virtualized components,
executing the building blocks on the replacement virtualized components; and
transferring network traffic from the virtualized components to the replacement virtualized components.

20. The system of claim 16, wherein the virtualized components comprise at least one of a virtual network function and a virtual machine.

\* \* \* \* \*